(12) United States Patent
Maas et al.

(10) Patent No.: US 11,865,817 B2
(45) Date of Patent: Jan. 9, 2024

(54) THERMOPLASTIC MULTILAYER ARTICLES, METHODS OF MANUFACTURE, AND USES THEREOF

(71) Applicant: SABIC GLOBAL TECHNOLOGIES B.V., Bergen op Zoom (NL)

(72) Inventors: Christianus Johannes Jacobus Maas, Geleen (NL); Yuzhen Xu, Geleen (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 45 days.

(21) Appl. No.: 17/601,801

(22) PCT Filed: Apr. 28, 2020

(86) PCT No.: PCT/EP2020/061711
§ 371 (c)(1),
(2) Date: Oct. 6, 2021

(87) PCT Pub. No.: WO2020/221724
PCT Pub. Date: Nov. 5, 2020

(65) Prior Publication Data
US 2022/0203657 A1    Jun. 30, 2022

(30) Foreign Application Priority Data
Apr. 30, 2019  (EP) .................... 19172011

(51) Int. Cl.
*B32B 27/08*  (2006.01)
*B32B 3/30*   (2006.01)
(Continued)

(52) U.S. Cl.
CPC ............... *B32B 27/08* (2013.01); *B32B 3/30* (2013.01); *B32B 27/18* (2013.01); *B32B 27/308* (2013.01);
(Continued)

(58) Field of Classification Search
CPC ............ B32B 2250/24; B32B 2250/40; B32B 2264/102; B32B 2264/108;
(Continued)

(56) References Cited

U.S. PATENT DOCUMENTS 6,630,234 B1  10/2003  Tanisho et al.
8,859,087 B2  10/2014  Masuda et al.
(Continued)

FOREIGN PATENT DOCUMENTS

CN    206000380 U    3/2017
JP    2009062472 A   3/2009
(Continued)

OTHER PUBLICATIONS

International Search Report and Written Opinion for the corresponding International Application No. PCT/EP2020/061711; International Filing Date: Apr. 28, 2020, dated Jun. 19, 2020; 10 pages.

*Primary Examiner* — Lawrence D Ferguson
(74) *Attorney, Agent, or Firm* — CANTOR COLBURN LLP (57) ABSTRACT

A thermoplastic multilayer article comprises: a polycarbonate substrate comprising a polycarbonate composition comprising at least one of a polycarbonate homopolymer, a copolycarbonate, or a polycarbonate copolymer, the polycarbonate substrate having a first surface and an opposing second surface; and a first polyurethane layer laminated or coextruded on at least a portion of the first surface of the polycarbonate substrate, the first polyurethane layer comprising a first aliphatic thermoplastic polyurethane and a polyurethane UV stabilizer, wherein the first aliphatic thermoplastic polyurethane comprises first segments formed via a reaction of caprolactone and an aliphatic isocyanate, and second segments formed via a reaction of a chain extender and the aliphatic isocyanate.

16 Claims, 5 Drawing Sheets (51) Int. Cl.
*B32B 27/18* (2006.01)
*B32B 27/30* (2006.01)
*B32B 27/36* (2006.01)
*B32B 27/40* (2006.01)

(52) U.S. Cl.
CPC ............ *B32B 27/365* (2013.01); *B32B 27/40* (2013.01); *B32B 2250/24* (2013.01); *B32B 2307/412* (2013.01); *B32B 2307/554* (2013.01); *B32B 2307/584* (2013.01); *B32B 2307/712* (2013.01); *B32B 2307/714* (2013.01); *B32B 2551/00* (2013.01)

(58) Field of Classification Search
CPC ........ B32B 2274/00; B32B 2307/3065; B32B 2307/412; B32B 2307/554; B32B 2307/584; B32B 2307/712; B32B 2307/714; B32B 2307/732; B32B 2307/748; B32B 2307/762; B32B 2419/00; B32B 2551/00; B32B 2605/006; B32B 2605/08; B32B 2607/00; B32B 27/08; B32B 27/18; B32B 27/30; B32B 27/308; B32B 27/365; B32B 27/40; B32B 3/30

See application file for complete search history.

(56) References Cited

U.S. PATENT DOCUMENTS

| | | |
|---|---|---|
| 2006/0019099 A1 | 1/2006 | Wang et al. |
| 2006/0201614 A1 | 9/2006 | Mulcahy et al. |
| 2014/0295363 A1 | 10/2014 | Sun et al. |
| 2015/0140300 A1 | 5/2015 | Pudleiner et al. |
| 2018/0117881 A1 | 5/2018 | Pyles et al. |

FOREIGN PATENT DOCUMENTS

| | | |
|---|---|---|
| WO | 2013175448 A1 | 11/2013 |
| WO | 2014072923 A1 | 5/2014 |
| WO | 2015125102 A1 | 8/2015 |
| WO | 2017216680 A1 | 12/2017 |

THERMOPLASTIC MULTILAYER ARTICLES, METHODS OF MANUFACTURE, AND USES THEREOF

CROSS-REFERENCE TO RELATED APPLICATIONS

This application is a National Stage application of PCT/EP2020/061711, filed Apr. 28, 2020, which claims the benefit of EP19172011.9, filed Apr. 30, 2019, both of which are incorporated by reference herein in their entirety.

BACKGROUND

This disclosure relates to multilayer articles, and their methods of manufacture, and in particular thermoplastic multilayer articles having improved scratch and abrasion resistance and flexibility, and their methods of manufacture.

Most transparent films or sheets, especially used for glazing, automotive, electronics, and building and construction applications, need a surface treatment in order to improve their scratch and abrasion resistance. Polycarbonate films and sheets are often coated with a silicate or acrylic hardcoat. While these hardcoats protect the underneath polycarbonate films and sheets, they are brittle. Thus the coated polycarbonate films and sheets cannot be vacuum formed or 3D shaped anymore. One way to address the issue is to thermoform polycarbonate sheets into a desired shape first and then coat the formed article to improve its scratch and abrasion resistance. Another way to address the issue is to apply a UV curable hardcoat on polycarbonate sheets or films, partially cure the hardcoat, thermoform the partially cured sheets or films to a desired shape, and then fully cure the hardcoat. However, these methods are costly and time consuming. In addition, they cannot be used to make articles having complex shapes.

Accordingly, there remains a need in the art for scratch and abrasion resistant and thermoformable multilayer sheets and films. It would be a further advantage if such multilayer sheets and films have good weatherability, chemical resistance, and optical properties.

SUMMARY

A thermoplastic multilayer article comprises a polycarbonate substrate comprising a polycarbonate composition comprising at least one of a polycarbonate homopolymer, a copolycarbonate, or a polycarbonate copolymer, the polycarbonate substrate having a first surface and an opposing second surface; and a first polyurethane layer laminated or coextruded on at least a portion of the first surface of the polycarbonate substrate, the first polyurethane layer comprising a first aliphatic thermoplastic polyurethane and a polyurethane UV stabilizer, wherein the first aliphatic thermoplastic polyurethane comprises first segments formed via a reaction of caprolactone and an aliphatic isocyanate, and second segments formed via a reaction of a chain extender and the aliphatic isocyanate.

BRIEF DESCRIPTION OF THE DRAWINGS

A description of the figures, which are meant to be exemplary and not limiting, is provided in which.

DETAILED DESCRIPTION

The inventors hereof have found that thermoformable multilayer articles having excellent abrasion and scratch resistance can be obtained by disposing such as laminating or coextruding a polyurethane layer comprising an aliphatic thermoplastic polyurethane (TPU) on a polycarbonate substrate. Thermoplastic polyurethane films are normally used to wrap cars for paint protection. It is not expected that an aliphatic thermoplastic polyurethane layer can adhere to polycarbonate substrates to form multilayer articles that have excellent scratch and abrasion resistance yet at the same time are flexible enough to be thermoformed. Often glue adhesion layers are used on TPU film to enable good adhesion to substrates such as metal and polymers other than polycarbonates. The multilayer articles as disclosed herein can be transparent and further have improved chemical resistance and good weatherability as compared to polycarbonate substrates without the polyurethane layer.

Accordingly, in an embodiment, disclosed are multilayer articles having a polycarbonate substrate and a polyurethane layer coextruded or laminated on at least a portion of a surface of the polycarbonate substrate. The polyurethane layer can be disposed across an entire surface of the polycarbonate substrate.

The polyurethane layer comprises an aliphatic thermoplastic polyurethane and a polyurethane UV stabilizer. As used herein, the term "thermoplastic polyurethane" refers to a multi-phase block copolymer formed when a polyaddition reaction occurs between an isocyanate and an isocyanate-reactive component.

When the isocyanate is aliphatic, the thermoplastic polyurethane can be referred to as an "aliphatic thermoplastic polyurethane." When the isocyanate is aromatic, the thermoplastic polyurethane can be referred to as an "aromatic thermoplastic polyurethane." It has been found that when an aromatic thermoplastic polyurethane layer is laminated or coextruded with a polycarbonate substrate, the multilayer article tends to turn yellow when exposed to UV radiation.

On the other hand, an aliphatic thermoplastic polyurethane as disclosed herein provides desired UV protection to polycarbonate substrates.

Aliphatic thermoplastic polyurethanes can be formed from the reaction of caprolactone, a chain extender, and an aliphatic isocyanate. The aliphatic thermoplastic polyurethanes have soft segments and hard segments. The soft segments, formed via the reaction of the caprolactone and the aliphatic isocyanate, provide flexibility to the thermoplastic polyurethane. The hard segments, formed via the reaction of the chain extender and the aliphatic isocyanate, provide the thermoplastic polyurethane with toughness and other mechanical properties. TPUs formed from caprolactone are generally be referred to as polycaprolactone TPUs or polycaprolactone based TPUs.

Examples of aliphatic isocyanate include monomeric isocyanate and polymeric isocyanate. In addition, the aliphatic isocyanate can include prepolymers, e.g. polyols reacted with excess isocyanate. Combinations of different aliphatic isocyanates can be used. Examples of aliphatic isocyanate are 1,6-hexamethylene diisocyanate (HDI), cyclohexyl diisocyanate (CHDI), isophorone diisocyanate (IPDI), 4,4-dicyclohexylmethane diisocyanate (HMDI), or a combination thereof.

The chain extender used to form the aliphatic thermoplastic polyurethanes has two or more hydroxyl groups or two or more amine groups. Examples of the chain extender include 1,4-butanediol, ethylene glycol, diethylene glycol, propylene glycol, 1,4-butylene glycol, 1,5-pentylene glycol, methylpentanediol, 1,6-hexylene glycol, neopentyl glycol, trimethylolpropane, hydroquinone ether alkoxylate, resorcinol ether alkoxylate, glycerol, pentaerythritol, diglycerol, dextrose, ethylenediamine, hexamethylenediamine, and isophorone diamine, diethanolamine, triethanolamine, diisopropanolamine, and the alike, and combinations thereof.

The polyurethane UV stabilizer in the polyurethane layer can be a UV stabilizer as described herein in the context of the polycarbonate substrates. Other UV stabilizers known in the art may also be used so long as they absorb UV rays to protect the aliphatic TPU layer and the underlaying polycarbonate substrate, while at the same time do not adversely affect the transparency and chemical stability of the aliphatic TPU. More than one UV stabilizer can be used. The amount of the UV stabilizer in the polyurethane layer can be adjusted based on the specific UV stabilizer used and the desired weatherability to be achieved. In general, the UV stabilizer can be present in the polyurethane layer in an amount of 0.1 to 5 wt % or 0.3 to 1 wt % based on the total weight of the polyurethane layer.

The polyurethane layer can optionally comprise an additive selected from flame retardants, antioxidants, thermal stabilizers, anti-static agents, and the like, or a combination comprising at least one of the foregoing additives, so long as they do not adversely affect the scratch and abrasion resistance, and the optical properties of the polyurethane layer. Selection of particular additives and their amounts can be performed by those skilled in the art.

Optionally, the polyurethane layer can further have a self-healing coating, an anti-bacterial coating, a scratch resistant coating, or a combination thereof.

The aliphatic thermoplastic polyurethane layer can be disposed on at least a portion of a surface of a polycarbonate substrate. The aliphatic thermoplastic polyurethane layer can be disposed on an entire surface of a polycarbonate substrate. The aliphatic thermoplastic polyurethane layer can also be disposed on different surfaces of a polycarbonate substrate. For example, the multilayer article can have two polyurethane layers disposed on opposing surfaces of a polycarbonate substrate.

The polycarbonate substrates comprise a polycarbonate composition, which contains at least one of a polycarbonate homopolymer, a copolycarbonate, or a polycarbonate copolymer, and preferably comprises a polycarbonate homopolymer such as a linear polycarbonate homopolymer. As used herein, polycarbonate substrates can be solid substrates or hollow substrates. A hollow substrate has a first layer, a second opposing layer, and a hollow portion disposed between the first and second layers. The hollow portion includes empty spaces and two or more walls connecting the first layer to the second layer.

"Polycarbonate" as used herein has repeating structural carbonate units of the formula (1)

wherein at least 60 percent of the total number of $R^1$ groups are aromatic, or each $R^1$ contains at least one $C_{6-30}$ aromatic group. Polycarbonates and their methods of manufacture are known in the art, being described, for example, in WO 2013/175448 A1, US 2014/0295363, and WO 2014/072923. Polycarbonates are generally manufactured from bisphenol compounds such as 2,2-bis(4-hydroxyphenyl) propane ("bisphenol-A" or "BPA"), 3,3-bis(4-hydroxyphenyl) phthalimidine, 1,1-bis(4-hydroxy-3-methylphenyl)cyclohexane, or 1,1-bis(4-hydroxyphenyl)-3,3,5-trimethylcyclohexane (isophorone), or a combination comprising at least one of the foregoing bisphenol compounds can also be used. In a specific embodiment, the polycarbonate is a homopolymer derived from BPA; a copolycarbonate derived from BPA and another bisphenol or dihydroxy aromatic compound such as resorcinol; or a copolymer derived from BPA and optionally another bisphenol or dihydroxyaromatic compound, and further comprising non-carbonate units, for example aromatic ester units such as resorcinol terephthalate or isophthalate, aromatic-aliphatic ester units based on $C_{6-20}$ aliphatic diacids, polysiloxane units such as polydimethylsiloxane units, or a combination comprising at least one of the foregoing.

Preferably the polycarbonate composition comprises a linear homopolymer containing bisphenol A carbonate units, commercially available under the trade name LEXAN™ from SABIC, or a poly(aliphatic ester-carbonate) comprising bisphenol A carbonate units and sebacic acid-bisphenol A ester units, commercially available under the trade name LEXAN™ HFD from SABIC, or a combination thereof. The linear homopolymer containing bisphenol A carbonate units can have a weight average molecular weight of 28,000 to 40,000 Daltons or 30,000 to 35,000 Daltons as measured by gel permeation chromatography (GPC), using a crosslinked styrene-divinylbenzene column and calibrated to bisphenol A homopolycarbonate references. GPC samples are prepared at a concentration of 1 mg per ml, and are eluted at a flow rate of 1.5 ml per minute. The linear homopolymer containing bisphenol A carbonate units can have endgroups derived from an end-capping agent such as phenol, p-cumylphenol, or a combination comprising at least one of the foregoing.

The polycarbonate composition further comprises a substrate UV stabilizer. The UV stabilizers can include hydroxybenzophenones; hydroxybenzotriazoles; hydroxybenzotriazines; cyanoacrylates; oxanilides; benzoxazinones; aryl salicylates; monoesters of diphenols such as resorcinol monobenzoate; 2-(2H-benzotriazol-2-yl)-4-(1,1,3,3-tetramethylbutyl)-phenol (CYASORB 5411); 2-hydroxy-4-n-octyloxybenzophenone (CYASORB 531); 2-[4,6-bis(2,4-dimethylphenyl)-1,3,5-triazin-2-yl]-5-(octyloxy)-phenol (CYASORB 1164); 2,2'-(1,4-phenylene)bis(4H-3,1-benzoxazin-4-one) (CYASORB UV 3638); poly[(6-morphilino-s-triazine-2,4-diyl)[2,2,6,6-tetramethyl-4-piperidyl) imino]-hexamethylene[(2,2,6,6-tetramethyl-4-piperidyl)imino], 2-hydroxy-4-octyloxybenzophenone (UVINUL 3008), 6-tert-butyl-2-(5-chloro-2H-benzotriazole-2-yl)-4-methylphenyl (UVINUL 3026), 2,4-di-tert-butyl-6-(5-chloro-2H-benzotriazole-2-yl)-phenol (UVINUL 3027), 2-(2H-benzotriazole-2-yl)-4,6-di-tert-pentylphenol (UVINUL 3028), 2-(2H-benzotriazole-2-yl)-4-(1,1,3,3-tetramethylbutyl)-phenol (UVINUL 3029), 1,3-bis[(2'cyano-3',3'-diphenylacryloyl)oxy]-2,2-bis-{[(2'-cyano-3',3'-diphenylacryloyl)oxy]methyl}-propane (UVINUL 3030), 2-(2H-benzotriazole-2-yl)-4-methylphenol (UVINUL 3033), 2-(2H-benzotriazole-2-yl)-4,6-bis(1-methyl-1-phenyethyl)phenol (UVINUL 3034), ethyl-2-cyano-3,3-diphenylacrylate (UVINUL 3035), (2-ethylhexyl)-2-cyano-3,3-diphenylacrylate (UVINUL 3039), N,N'-bisformyl-N,N'-bis(2,2,6,6-tetramethyl-4-piperidinyl)hexamethylendiamine (UVINUL 4050H), bis-(2,2,6,6-tetramethyl-4-piperidyl)-sebacate (UVINUL 4077H), bis-(1,2,2,6,6-pentamethyl-4-piperdiyl)-sebacate and methyl-(1,2,2,6,6-pentamethyl-4-piperidyl)-sebacate (UVINUL 4092H) 1,3-bis[(2-cyano-3,3-diphenylacryloyl)oxy]-2,2-bis[[(2-cyano-3, 3-diphenylacryloyl)oxy]methyl]propane (UVINUL 3030); 2,2'-(1,4-phenylene) bis(4H-3,1-benzoxazin-4-one); 1,3-bis[(2-cyano-3,3-diphenylacryloyl)oxy]-2,2-bis[[(2-cyano-3,3-diphenylacryloyl)oxy]methyl]propane; TINUVIN 234; nano-size inorganic materials such as titanium oxide, cerium oxide, and zinc oxide, all with particle size less than or equal to 100 nanometers; or the like, or combinations comprising at least one of the foregoing UV stabilizers. Preferably the substrate UV stabilizer is phenol, 2-(2H-benzotriazol-2-yl)-4,6-bis(1-methyl-1-phenylethyl) (TINUVIN 234), 2,2'-methylenebis[6-(2H-benzotriazol-2-yl)-4-(1,1,3,3-tetramethylbutyl)phenol] (LA31), or a combination thereof. The substrate UV stabilizer can be present in an amount of 0.03 to 1 wt % or 0.1 to 0.3 wt % based on the total weight of the polycarbonate composition. The UV stabilizers in the substrate, the polyurethane layer, and the overlay layer can be the same or different.

The polycarbonate composition can optionally include a flame retardant. Useful flame retardants include organic compounds that include phosphorus, bromine, or chlorine. When used, the organic flame retardants are present in amounts of 0.1 to 30 parts by weight, more specifically 1 to 20 parts by weight, based on 100 parts by weight of the total composition. Inorganic flame retardants can also be used, for example salts of $C_{1-16}$ alkyl sulfonate salts such as potassium perfluorobutane sulfonate (Rimar salt), potassium perfluoroctane sulfonate, tetraethylammonium perfluorohexane sulfonate, and potassium diphenylsulfone sulfonate; salts such as $Na_2CO_3$, $K_2CO_3$, $MgCO_3$, $CaCO_3$, and $BaCO_3$, or fluoro-anion complexes such as $Li_3AlF_6$, $BaSiF_6$, $KBF_4$, $K_3AlF_6$, $KAlF_4$, $K_2SiF_6$, or $Na_3AlF_6$. When present, inorganic flame retardant salts are present in amounts of 0.01 to 10 parts by weight, more specifically 0.02 to 1 parts by weight, based on 100 parts by weight of the polycarbonate composition.

Optionally, the polycarbonate composition can have good flame retardant properties. Flammability tests can be performed following the procedure of Underwriter's Laboratory Bulletin 94 entitled "Tests for Flammability of Plastic Materials for Parts in Devices and Appliances" (ISBN 0-7629-0082-2), Fifth Edition, Dated Oct. 29, 1996, incorporating revisions through and including Dec. 12, 2003. Several ratings can be applied based on the rate of burning, time to extinguish, ability to resist dripping, and whether or not drips are burning. According to this procedure, materials can be classified as UL94 HB, V0, V1, V2, VA and/or VB. A molded sample of the polycarbonate composition can achieve a UL94 V0 or V1 rating at a thickness of 1.5 mm (±10%), preferably the polycarbonate composition can achieve a UL94 V0 or V1 rating at a thickness of 0.4 mm (±10%), and more preferably the polycarbonate composition can achieve a UL94 V0 or V1 rating at a thickness of 0.25 mm (±10%).

Optionally the polycarbonate composition can include various additives ordinarily incorporated into polymer compositions of this type, with the proviso that the additive(s) are selected so as to not significantly adversely affect the desired properties of the polycarbonate composition, in particular aesthetics. Additives include fillers, reinforcing agents, antioxidants, heat stabilizers, plasticizers, lubricants, mold release agents, antistatic agents, flame retardants, colorants such as such as titanium dioxide, carbon black, and organic dyes, surface effect additives, radiation stabilizers, and anti-drip agents. A combination of additives can be used, for example a combination of a heat stabilizer, mold release agent, and flame retardant. The additives can be used in the amounts generally known to be effective. In an embodiment, the polycarbonate compositions comprise no more than 10 wt % or no more than 5 wt %, for example 0.1 to 10 wt %, preferably 0.1 to 5 wt %, more preferably 0.1 to 1 wt % of an additive comprising at least one of a processing aid, a heat stabilizer, and an antioxidant, each based on the total weight of the polycarbonate core substrate.

An overlay layer can be disposed between the polycarbonate substrate and the polyurethane layer, wherein the overlay layer comprises an overlay layer UV stabilizer and at least one of an overlay layer polycarbonate, an acrylic polymer, or a poly(methyl methacrylate).

The overlay layer polycarbonate can be the same or different from the polycarbonate in the substrate. A specific example of the overlay layer polycarbonate is a linear homopolymer containing bisphenol A carbonate units, commercially available under the trade name LEXAN™ from SABIC.

The overlay layer UV stabilizer can be the same or different from the substrate UV stabilizer and the polyurethane UV stabilizer. Examples of the overlay layer UV stabilizer include those described herein in the context of the substrate UV stabilizer. When the overlay layer comprises the overlay layer polycarbonate or poly(methyl methacrylate), the overlay layer UV stabilizer is present in an amount of 1 to 12 wt % or 6 to 10 wt % based on the total weight of the overlay layer. Preferably, the overlay polycarbonate layer comprises 5 to 15 wt % or 8 to 12 wt % of 2,2-bis (((2-cyano-3,3-diphenylacryloyl)oxy)methyl)propane-1,3-diyl bis(2-cyano-3,3-diphenylacrylate) (UVINUL 3030), or 5 to 15 wt % or 5 to 10 wt % of 2,2'-methylenebis[6-(2H-benzotriazol-2-yl)-4-(1,1,3,3-tetramethylbutyl)phenol] (LA 31). The overlay layer can have a thickness of 15 to 300 micrometers (µm) or 20 to 250 micrometers.

When the overlay layer comprises the acrylic polymer, the overlay layer UV stabilizer is present in an amount of 20 to 50 wt % based on the total weight of the overlay layer. The overlay layer can have a thickness of 1 to 10 micrometers.

The overall thickness of the thermoplastic multilayer articles can be up to and even exceeding several hundred millimeters. More specifically, the multilayer articles can have a thickness (e.g., gauge) of 0.2 millimeter (mm) to 150 millimeters. The polyurethane layer can have a thickness of 25 to 300 micrometers, 50 to 250 micrometers, 30 to 100 micrometers, or 40 to 70 micrometers. The polycarbonate substrate has a thickness of 0.1 to 15 millimeters. When the polycarbonate substrate is hollow, it can have a thickness of 2 to 155 millimeters.

The inventors have found that applying a polyurethane layer as described herein to a polycarbonate substrate significantly improves the scratch and abrasion resistance of the substrate without adversely affecting the desired transparency and thermoformability of the substrate. This is unexpected because polycarbonate substrates coated with other known hard coats are normally brittle, thus cannot be vacuum formed or 3D shaped anymore.

The multilayer articles can have excellent sand abrasion resistance. After a sand trickling test according to DIN 52348 conducted on the polyurethane layer for 5 cycles, the multilayer articles have a delta haze of less than 5%, less than 2%, or less than 1%, determined according to ASTM D-1003-00, Procedure A, under D65 illumination, with a 10 degrees observer using a Haze-Gard test device.

The multilayer articles can also have excellent Taber abrasion resistance. After Taber abrasion testing on the polyurethane layer using CS-10F abrading wheels and 500 gram weights for 500 cycles in accordance with ASTM D1044-13, the multilayer articles can have a delta haze of less than 10% determined according to ASTM D-1003-00, Procedure A, under D65 illumination, with a 10 degrees observer using a Haze-Gard test device.

The multilayer articles can further have excellent metal wool abrasion resistance. The multilayer articles can have a delta haze of less than 5%, less than 2%, or less than 1%, determined according to ASTM D-1003-00, Procedure A, under D65 illumination, with a 10 degrees observer using a Haze-Gard test device, after a metal wool abrasion testing on the polyurethane layer using grade 0000 steel wool taped to a 1 cm×1 cm part weighing 1,000 grams for 10 times.

The multilayer articles can have very good adhesion between the polyurethane layer and the polycarbonate substrate. The polyurethane layer can also have good adhesion with the overlay layer, if present. A "cross hatch tape test" as used herein is a test to determine the adhesion strength between the polycarbonate substrate and the polyurethane layer. The multilayer articles as disclosed herein exhibit a cross hatch tape test rating of GT0 determined according to ASTM D3359-09.

The multilayer articles have excellent weatherability. The multilayer articles can have a delta haze of less than 2% and a delta transmission of less than 1%, determined according to ASTM D-1003-00, Procedure A, under D65 illumination, with a 10 degrees observer using a Haze-Gard test device, after 3,000 hours of accelerated weathering according to ISO 11341-2004. The multilayer articles can also have a delta haze of less than 5%, determined according to ASTM D-1003-00, Procedure A, under D65 illumination, with a 10 degrees observer using a Haze-Gard test device, after 7,000 hours of accelerated weathering according to ISO 11341-2004.

The multilayer articles have a delta yellowness index of less than 4% as measured by ASTM D1925-70, after 7,000 hours of accelerated weathering according to ISO 11341-2004.

The multilayer articles have improved chemical resistance as compared to the polycarbonate substrate. Improved chemical resistance may be found against methyl ethyl ketone, xylenes such as o-xylene, toluene, acetone, isopropanol, surface cleaners, wipes, hand creams, and hand lotions.

The multilayer articles are also thermoformable. As used herein, a thermoformable article means that the article can be thermoformed into a shape without mechanical failure of the article during a thermoforming process (e.g., without cracking, tearing, or other mechanical failure). For example, the multilayer articles can be stretched for up to 300% without any cracking of the polyurethane layer during a thermoforming process.

The multilayer articles also have excellent optical properties. The multilayer articles can have a light transmission of greater than 90% determined according to ASTM D-1003-00, Procedure A, under D65 illumination, with a 10 degrees observer using a Haze-Gard test device.

The multilayer articles can also have self-healing properties. For example, when the aliphatic polyurethane layer is damaged by CS-17 abrading wheels with a 1 kilogram weight for 1000 cycles in accordance with ASTM D1044-13, the haze of the multilayer article can be restored almost to the original haze value before the damage with a change in haze ("ΔH") of less than 10% or less than 5%, after the aliphatic polyurethane layer is heated with a hot air gun at 130° C. for 10 seconds.

Figure 1:
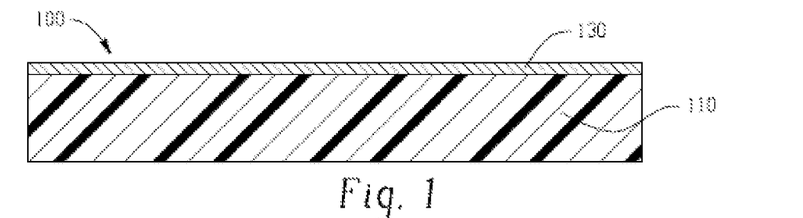
FIG. 1 is a cross sectional view of a thermoplastic multilayer article having a polycarbonate substrate and a polyurethane layer disposed on a surface of the substrate.
Figure 2:
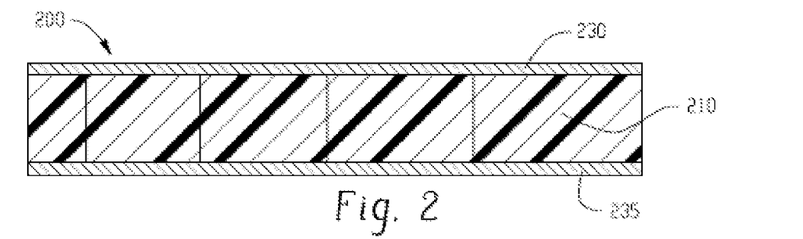
FIG. 2 is a cross sectional view of a thermoplastic multilayer article having a hollow polycarbonate substrate and two polyurethane layers disposed on opposing surfaces of the substrate.
Figure 3:
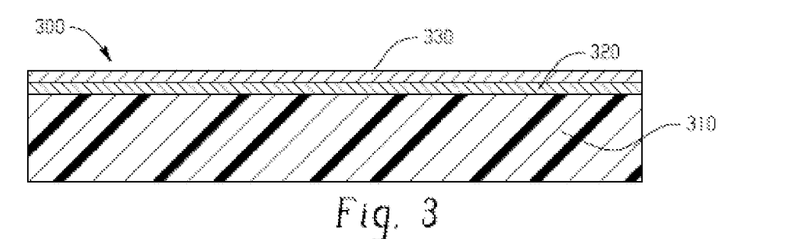
FIG. 3 is a cross sectional view of a thermoplastic multilayer article having a polycarbonate substrate, a polyurethane layer, and an overlay layer disposed between the substrate and the polyurethane layer.
Figure 4:
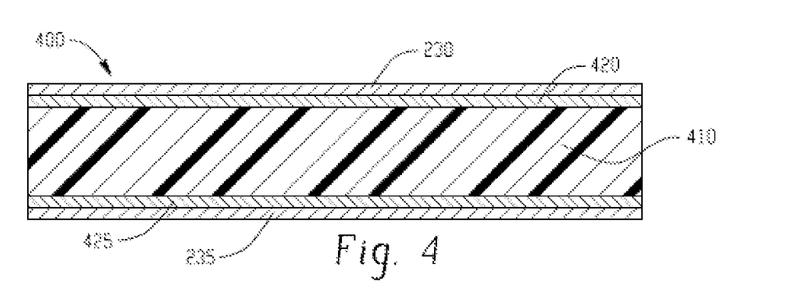
FIG. 4 is a cross sectional view of another thermoplastic multilayer article.

Specific examples of thermoplastic multilayer articles are illustrated in FIGS. 1-4. The multilayer article (100) in FIG. 1 has a polycarbonate substrate (110) and an aliphatic thermoplastic polyurethane layer (130) disposed on a surface of the polycarbonate substrate (110). FIG. 2 illustrates an article (200) having a hollow polycarbonate substrate (210) and aliphatic thermoplastic polyurethane layers (230, 235) disposed on opposing surfaces of the polycarbonate substrate (210). One or more overlay layers can be present. In FIG. 3, the article (300) has a polycarbonate substrate (310), an aliphatic thermoplastic polyurethane layer (330), and an overlay layer (320) disposed between the polycarbonate substrate and the aliphatic polyurethane layer. In FIG. 4, the article (400) has two aliphatic thermoplastic polyurethane layers (230, 235) disposed on opposing surfaces of a polycarbonate substrate (410), and overlay layers (420, 425) disposed between the polycarbonate substrate and the polyurethane layers.

The thermoplastic multilayer articles can be formed by various processes. For example, the polyurethane layer and the polycarbonate substrate can be laminated or coextruded in line during an extrusion process or off line with a lamination equipment.

Figure 5:
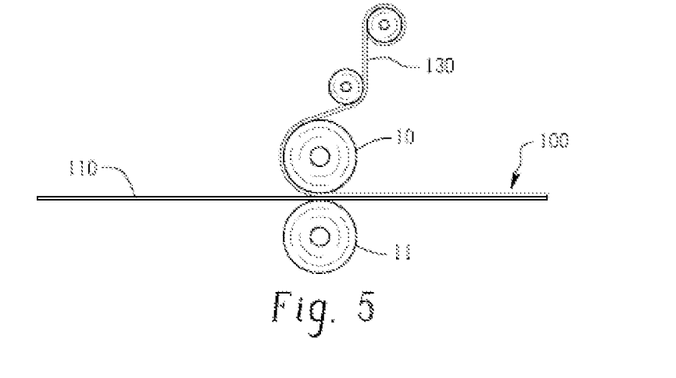
FIG. 5 illustrates a process of manufacturing the multilayer article of FIG. 1.

An off line lamination process is illustrated in FIG. 5. As shown in the figure, a polyurethane layer (130) and a polycarbonate substrate (110) are laminated between heated rollers (10, 11) under pressure forming a multilayer article (100). The temperature of the rollers (10, 11) can be 100 to 125° C. or 110 to 120° C. Before lamination, the polycarbonate substrate can have a temperature of 80 to 100° C., and the polyurethane layer can have a temperature of 115 to 130° C. Industrial laminator such as a CREST laminator can be used.

Figure 6:
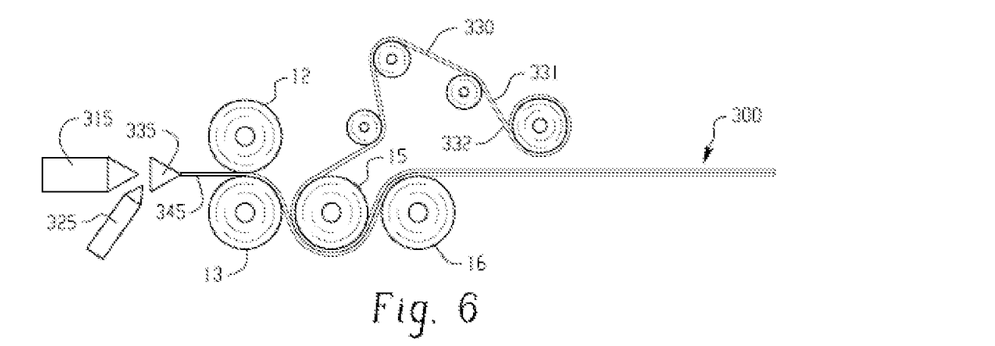
FIG. 6 illustrates a process of manufacturing the multilayer article of FIG. 3.

The polyurethane layer can also be laminated onto a polycarbonate substrate directly in line during an extrusion process. Referring to FIG. 6, first and second single screw extruders (315, 325) can supply polymer melts for the substrate and the overlay layer into a feed block of an extruder apparatus. A die (335) forms a molten polymeric web (345) that is successively squeezed between first and second rollers (12, 13). A polyurethane layer (330) and the substrate having the overlay layer then go through second and third rollers (13, 15) as well as third and fourth rollers (15, 16) forming a multilayer article (300). The temperature of the rollers is 160 to 200° C. or about 170 to 190° C. A polyester carrier can be used on the polyurethane layer. During lamination, the polyester carrier (332) is in direct contact with the third roller (15) thus protecting the polyurethane film/sheet (330) against too much heat coming from the calendar rolls. The polyester carrier can also protect the TPU layer from sticking to the heated rolls. The polyurethane side (331) faces the substrate, thus the polyurethane is in direct physical contact with the overlay layer on the substrate after lamination. The polyester carrier can be removed later after lamination, if needed. In addition, the polyurethane layer is preferably fed directly to the nip between rollers 13 and 15 to minimize the contact time of the polyurethane layer with the heated roller 15.

Figure 7:
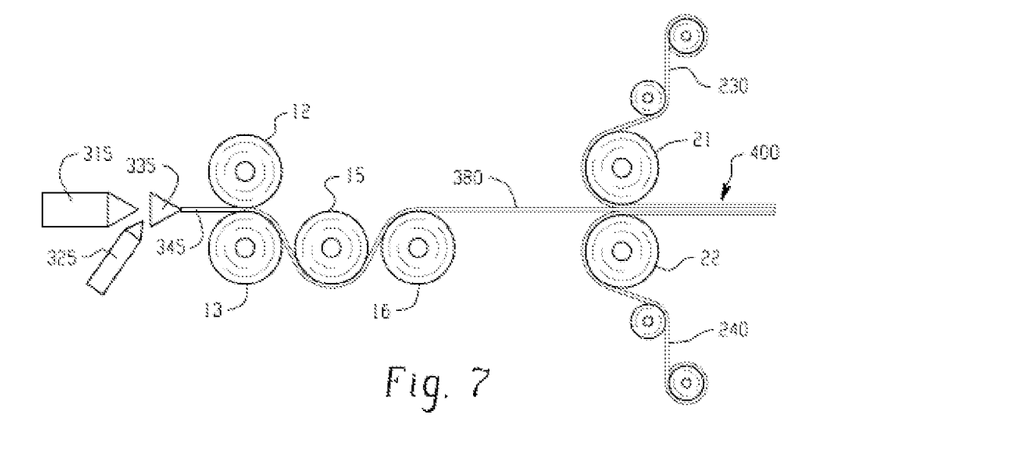
FIG. 7 illustrates a process of manufacturing the multilayer article of FIG. 4.

A process of manufacturing the multilayer article of FIG. 4 is illustrated in FIG. 7. Referring to FIG. 7, first and second single screw extruders (315, 325) can supply polymer melts for the substrate and the overlay layer into a feed block of an extruder apparatus. A die (335) forms a molten polymeric web (345), which is successively squeezed between first and second rollers (12, 13), second and third rollers (13, 15) as well as fourth and fifth rollers (15, 16) to form a substrate with an overlay layer (380). A first polyurethane layer (230), a second polyurethane layer (240), and the substrate with the overlay layer (380) are pressed between the fifth and sixth rollers (21, 22) during an offline lamination process, forming a multilayer article (400). The temperature of the fifth and sixth rollers can be 100 to 130° C. or 110 to 120° C. Each of the first and second polyurethane layers can have a polyester carrier to protect the polyurethane layers from being exposed to excessive heat during lamination.

The polyurethane layers can be pre-formed. The polyurethane layers can also be formed by extrusion during the process to manufacture the multilayer article. For example, a polycarbonate substrate composition is first extruded at a temperature of 200 to 230° C. to form a polycarbonate substrate. A polyurethane composition can then be extruded at a temperature of 140 to 150° C. forming a polyurethane polymer web disposed on the polycarbonate substrate. Both the polycarbonate substrate and the polyurethane web are pressed between heated rollers with a temperature of 170 to 190° C., forming the multilayer articles.

The multilayer articles can also be manufactured using a coextrusion line with a multi-manifold die. The polycarbonate substrate composition and the polyurethane layer composition can be selected such that the glass transition temperature (Tg) difference between the two compositions is less than 50° C. In an embodiment, a composition comprising a poly(aliphatic ester-carbonate) having bisphenol A carbonate units and sebacic acid-bisphenol A ester units is used as the polycarbonate substrate composition during coextrusion.

The formed multilayer articles can be thermoformed subsequently if needed to form articles having various shapes. The multilayer articles can be used in glazing, electrical and electronic, automotive, building and construction applications. Examples of the multilayer articles include sound walls, cellphone backcover, automotive interior, machine guards, ski gondolas, separation walls, bus blazing, visors, and goggles.

The above described and other features are exemplified by the following examples.

EXAMPLES

The samples used in the Examples are described in Table 1, and the standard tests performed are summarized in Table 2.

TABLE 1

| Sample | Description | Source |
|---|---|---|
| A | A polycarbonate sheet without UV protection, 4 mm, available as LEXAN ™ 9030 sheet | SABIC |
| B | A polycarbonate sheet with a co-extruded polycarbonate overlay layer containing 10% UV absorber and having a thickness of 60 μm on both sides, 4 mm total thickness, available as LEXAN ™ EXCELL D sheet | SABIC |
| C | A silica coated polycarbonate sheet with an acrylic primer, 4 mm total thickness, available as LEXAN ™ MARGARD ™ MR5E | SABIC |
| D | A polycarbonate sheet coated with a melamine based flexible hard coat, 4 mm total thickness, available as LEXAN ™ MARGARD ™ FMR5XT | SABIC |
| E | A polycarbonate sheet coated with a dual cure flexible hard coat, 3 mm total thickness, available as FHC10-112 | SABIC |
| F | A polycarbonate and poly(methyl methacrylate) (PMMA) coextruded sheet, 8 mm total thickness | SABIC |
| G | A copolyester, polyethylene terephthalate glycol (PETG) sheet, 3 mm | COVESTRO |
| H | A sheet comprising a poly(aliphatic ester-carbonate) that contains bisphenol A carbonate units and sebacic acid-bisphenol A ester units without UV protection, available as LEXAN ™ ULG1003 | SABIC |
| 1 | Sample A (4 mm) with aliphatic TPU lamination (50 μm) on both sides | SABIC |
| 2 | Sample B (4 mm) with aliphatic TPU lamination (65 μm) on both sides | SABIC |
| 3 | Sample H (4 mm) with aliphatic TPU lamination (50 μm) on one side | SABIC |

TABLE 2

| Description | Test standards | Conditions |
|---|---|---|
| Transmission and haze | ASTM D-1003-00, Procedure A | Under D65 illumination, with a 10 degrees observer, at a thickness of 1 mm using a Haze-Gard test device |

TABLE 2-continued

| Description | Test standards | Conditions |
|---|---|---|
| Taber Abrasion | ASTM D1044-13 | Abrasive wheels: CS-10F, Auxiliary weights: 500 grams |
| Sand Abrasion | DIN52348-1985 | |
| Pencil Hardness | ASTM D3363-00 | 1,000 grams |
| Adhesion | ASTM D3359-09 | Cross hatch cutter tester |
| Accelerated Weathering | ISO 11341-2004 | |
| Yellowness Index | ASTM D1925-70 | |
| Yellowness Index | ASTM E313-15e1 | |

Steel wood scratch resistance was tested using grade 0000 steel wool taped to a 1 cm×1 cm part weighing 1,000 grams. The steel wool side was rubbed back and forth on the coated surface of the sample to be tested.

Chemical resistance was evaluated by disposing one drop of the solvent of interest on a surface of the sample under a fume hood. After 24 hours, the surface was inspected for defects. The results were reported as ---, --, -, +, ++ and +++, ranging from poor performance (---) to excellent chemical resistance (+++).

Thermoformability: Polycarbonate was vacuum formed at a temperature of 180° C. Vacuum forming is a simplified version of thermoforming, where a sample is heated to a forming temperature, stretched onto a single-surface mold, and forced against the mold by a vacuum. This process can be used to form thermoplastics into permanent objects such as turnpike signs and protective covers. Normally draft angles are present in the design of the mold (a recommended minimum of 3°) to ease removal of the formed thermoplastic part from the mold.

Lamination

Sample 1 was prepared by laminating a LEXAN™ 9030 sheet with an aliphatic thermoplastic polyurethane (TPU) type FPA87 film using a CREST laminator.

Sample 2 was prepared by laminating an aliphatic TPU type FPA 87 film on a coextruded polycarbonate sheet in line during a sheet extrusion process.

Sample 3 was prepared by laminating a LEXAN™ ULG1003 sheet with an aliphatic TPU type FPA 87 film using a CREST laminator.

The aliphatic TPU used in samples 1-3 had soft blocks derived from caprolactone and an aliphatic isocyanate. The aliphatic TPU is UV stabilized and has an 87A shore hardness.

Test Results

All of Samples 1-3 had a cross hatch tape test rating of GT0 based on ASTM D3359-09, which indicates that there were good adhesion between the polycarbonate sheets and the TUP films.

Sample 3 was submitted to accelerated weathering according to the following conditions:
Setting: ATLAS C15000/Standard: ISO11341
Light sources: xenon/Radiation: 300-400 nanometers (nM) 50 watts per square meter
Black standard T°: 65° C./Chamber T°: 45° C.
% RH: 70% at 21° C./Cycle: constant light The results of 7,000 hours accelerated weathering of Sample 3 are shown in Table 3.

TABLE 3

| L* | a | b | ASTM E313 YI | ASTM D1925 YI | Transmission (%) | Haze (%) |
|---|---|---|---|---|---|---|
| 95.61 | −0.34 | 0.71 | 1.09 | 1.09 | 89.4 | 2.9 |
| 95.60 | −0.34 | 0.70 | 1.08 | 1.08 | 89.8 | 2.8 |
| 95.33 | −0.34 | 0.75 | 1.18 | 1.18 | 90.2 | 2.9 |
| 95.64 | −0.36 | 0.77 | 1.19 | 1.19 | 90.1 | 3.13 |
| 95.30 | −0.34 | 0.79 | 1.26 | 1.26 | 90.2 | 2.46 |
| 95.44 | −0.35 | 0.77 | 1.21 | 1.21 | 90.2 | 2.78 |
| 95.41 | −0.35 | 0.77 | 1.21 | 1.21 | 90.2 | 3.01 |
| 95.16 | −0.33 | 0.71 | 1.12 | 1.12 | 90.2 | 3.02 |
| 95.58 | −0.36 | 0.77 | 1.2 | 1.2 | 90.2 | 2.87 |
| 95.34 | −0.34 | 0.75 | 1.18 | 1.18 | 90.2 | 2.98 |
| 95.4 | −0.3 | 0.7 | 1.2 | 1.2 | 90.1 | 2.9 |
| Average % change after 7,000 hours accelerated aging | | | | | | |
| 0.2 | 0.0 | 0.0 | 0.1 | 0.1 | 0.3 | 0.2 |

Before aging, sample 3 has a light transmission of 90%, a yellowness index of 0.1, and a haze of 0.7%. After 7,000 hours accelerated aging, which is equivalent to approximately 10 years of outdoor use, the delta yellowness index (ΔYI) of Sample 3 is 1.1%, the delta light transmission (ΔT) is 0.1%, and the delta haze (ΔH) is 2.2%. The results indicate that an aliphatic TPU film provides good protection to a polycarbonate sheet against UV, heat, and moisture.

Not all the polyurethane layers can provide the same weathering protection to polycarbonate substrates.

Figure 8:
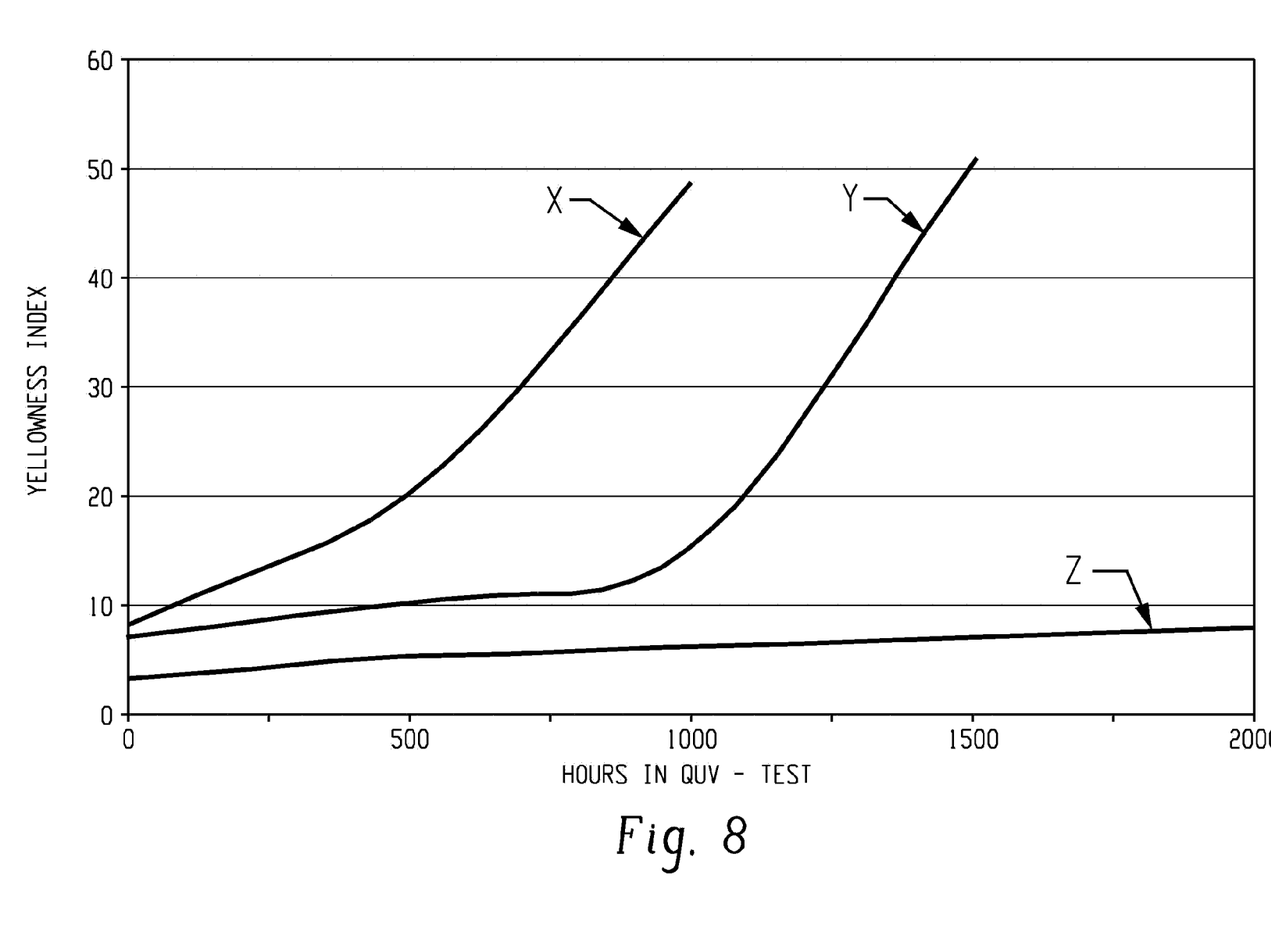
FIG. 8 compares the yellowness index of aliphatic thermoplastic polyurethane with a UV stabilizer and aromatic thermoplastic polyurethanes with or without UV stabilizers as a function of time.

FIG. 8 shows the difference between aliphatic caprolactone based TPU (line Z, with UV stabilizer) and aromatic TPU both with (line Y) and without (line X) UV stabilizers. The results indicate that aliphatic caprolactone based TPU has significantly less yellowing as compared to aromatic TPU both with and without UV stabilizers after a QUV accelerated exposure test using an accelerated weathering tester produced by Q Panel.

Figure 9:
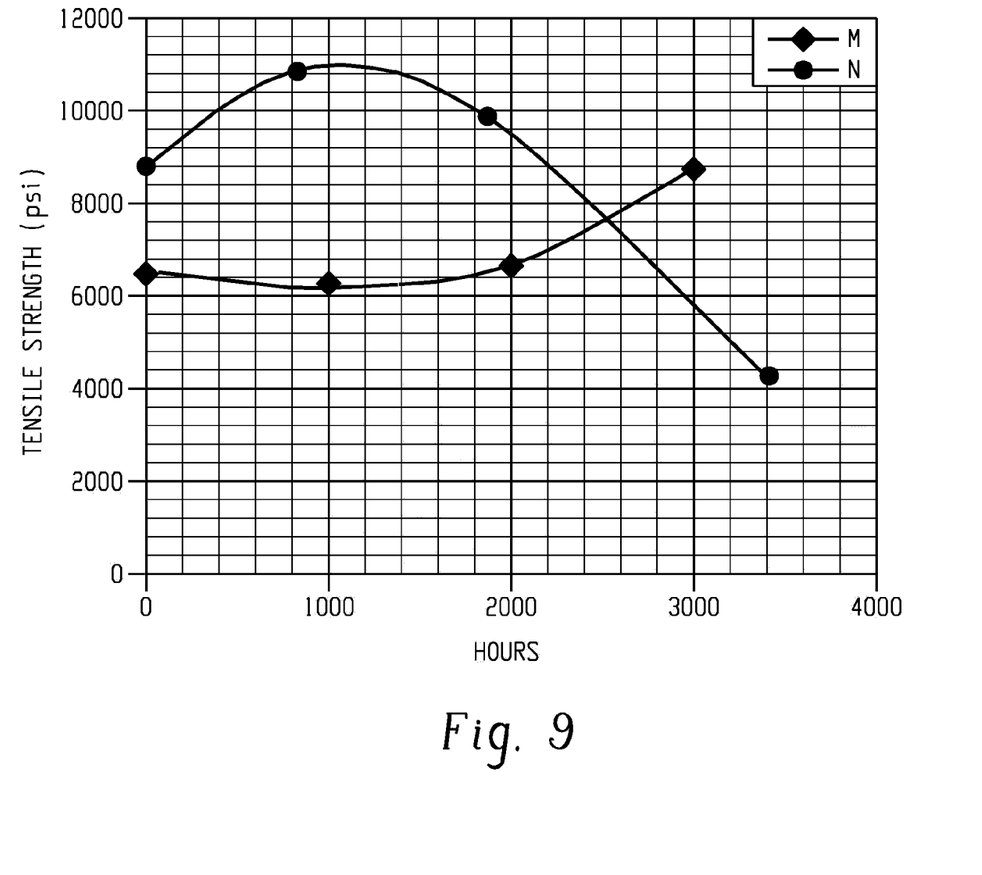
FIG. 9 compares the tensile strength of aliphatic caprolactone based thermoplastic polyurethane and aliphatic polyether based polyurethane as a function of time.

FIG. 9 shows the difference between the tensile strength of an aliphatic caprolactone based TPU film having a thickness of 50 microns (line M) and the tensile strength of an aliphatic polyether based polyurethane film with a thickness of 50 microns (line N) as a function of time. The results indicate that the tensile strength of aliphatic polyether based polyurethane film decreases after about 1000 hours during a QUV accelerated exposure test using an accelerated weathering tester produced by Q Panel, while the aliphatic caprolactone based TPU film has improved tensile strength after the same testing. Accordingly, after laminated on a polycarbonate substrate, after exposing to UV for an extended period of time, the aliphatic polyether based polyurethane layer can have deteriorated tensile strength and crack while caprolactone based TPU laminates can have integrated physical properties after extended UV exposure.

The light transmission, haze, abrasion resistance, pencil hardness, chemical resistance, and weathering properties of various comparative samples and samples according to the disclosure are summarized in Tables 4 and 5.

TABLE 4

| Test | A | B | 1 | 2 | C | D | E | F | G |
|---|---|---|---|---|---|---|---|---|---|
| Transmission*, % | 93 | 93 | 95 | 95 | 96 | 90 | 96 | 95 | 89 |
| Haze*, % | 0.3 | 0.3 | 0.4 | 0.7 | 0.1 | 0.8 | 0.1 | 1 | 0 |
| Taber ΔH after 500 cycles, % | 40 | 35 | 5.5 | 5 | 3.5 | 4 | 10.5 | 30 | 40 |
| Metal wool ΔH after 10 times, % | 30 | 30 | 1 | 0.5 | 0 | 8 | / | 26 | 30 |
| Sand abrasion ΔH after 5 times, % | 80 | 80 | 3 | 3 | 9 | 9.5 | / | 54 | / |
| Pencil hardness* | B-2B | B-2B | 5B-6B | 5B-6B | F-HB | F-HB | F-HB | HB-B | HB-B |
| Chemical resistance* | --- | --- | − | − | + | -- | + | + | − |
| Chemical resistance* 0.5% | -- | -- | − | − | --- | -- | − | / | / |
| Weathering | <1 year | >10 years | 10 years | >15 years | 5 years | NA | 5 years | NA | <1 year |

*with no aging.
Chemical resistance 0.5% means that the test sample was put under 0.5% strain.
A sample is considered as failing the weathering test when a crack is observed.

TABLE 5

| Sample | Taber ΔH after 500 cycles | Taber ΔT after 500 cycles |
|---|---|---|
| Sample H | 36% | −2.1% |
| Sample 3 | 7% | −1.3% |

Comparing the results of Sample A with Sample 1, laminating Sample A with an aliphatic TPU film increases the light transmission from 93% to 95%. Although the TPU layer is relatively soft with a pencil hardness of 5B-6B, the aliphatic TPU layer greatly increases the abrasion resistance of the polycarbonate sheet (Sample A). The taber ΔH after 500 cycles is reduced from 40% to 5.5%, the metal wool ΔH is reduced from 30% to 1%, and the sand abrasion ΔH is reduced from 80% to 3%, when tested on the aliphatic TPU side of the laminates. In addition, the aliphatic TPU laminated sheet (Sample 1) has improved chemical resistance and weathering performance. Without an aliphatic TPU film, Sample A has less than one year weatherability, and with the aliphatic TPU lamination, the polycarbonate sheet has 10 years weatherability.

Comparing the results of Sample B with Sample 2, laminating Sample B with an aliphatic TPU film increases the light transmission from 93% to 95%. Although the aliphatic TPU layer is relatively soft with a pencil hardness of 5B-6B, lamination with an aliphatic TPU film greatly increases the abrasion resistance of the polycarbonate sheet (Sample B). The taber ΔH after 500 cycles is reduced from 35% to 5%, the metal wool ΔH is reduced from 30% to 0.5%, and the sand abrasion ΔH is reduced from 80% to 3%, when tested on the aliphatic TPU side of the laminates. In addition, the aliphatic TPU laminated sheet (Sample 2) has improved chemical resistance, and weatherability. Without an aliphatic TPU film, Sample B has greater than 10 years weatherability, and with the aliphatic TPU lamination, the polycarbonate sheet has greater than 15 years weatherability.

The improvement on abrasion resistance with aliphatic TPU lamination is also observed for Sample 3 as shown in Table 5. Without the aliphatic TPU layer, a polycarbonate sheet (Sample H) has a taber abrasion ΔH of 36% and a taber abrasion ΔT of −2.1% after 500 cycles. After aliphatic TPU lamination, the same polycarbonate sheet has a taber abrasion ΔH of 7% and a taber abrasion ΔT of −1.3%, when tested on the aliphatic TPU side of the laminate.

Aliphatic TPU laminated samples also have improved properties compared to other hard coated or flexible coated polycarbonate sheets. Comparing Sample 1 with Sample D, a silica hard coated polycarbonate sheet, Sample 1 has comparable taber delta haze and comparable metal wool delta haze as Sample D but Sample 1 has a much better sand abrasion resistance with a delta haze of 3% versus 9%.

Among all the tested samples, Sample 1 and Sample 2 have the best sand abrasion resistance, scratch resistance, and weathering performance. In addition, Samples 1 and 2 have improved thermoformability versus other hardcoated sheets. Sample C cracks at 2-5% stretching while the aliphatic TUP laminated sheets can have up to 300% stretching.

Figure 10:
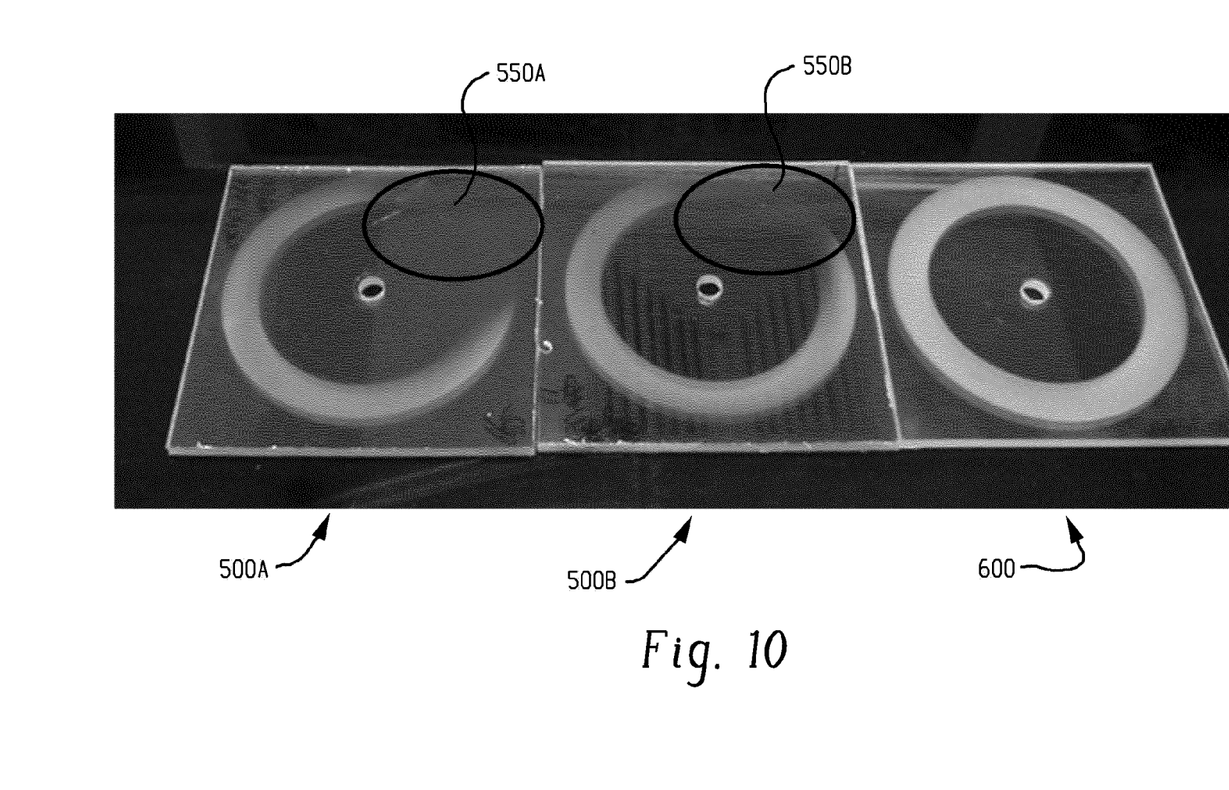
FIG. 10 illustrates the self-healing properties of the TPU layer on the multilayer article.

Aliphatic TPU laminated samples also have self-healing properties. The aliphatic TPU layer of Sample 2 and the hardcoat of Sample C were damaged by CS-17 abrading wheels with a 1 kilogram weight for 1000 cycles in accordance with ASTM D1044-13. Then the TPU layer of Sample 2 and the hardcoat of Sample C were treated with a hot air gun at 130° C. for 10 seconds. The images of the treated laminates are shown in FIG. 10. The laminates of Sample 2 (500A, 500B) have healed surfaces (550A, 550B), while the laminate of Sample C (600) does not show any self-healing property.

The self-healing properties of aliphatic TPU are further illustrated in Table 6. As shown in the table, after the abrasion test by CS-17 abrading wheels with a 1 kilogram weight for 1000 cycles in accordance with ASTM D1044-13, the aliphatic TPU laminate (Sample 2) has a haze of 42% and the silica coated polycarbonate sheet (Sample C) has a haze of 66%. After the TPU layer of Sample 2 and the silica hardcoat of Sample C were treated with a hot air gun at 130° C., the haze of the aliphatic TPU laminate is almost restored to the original haze level while the haze of the silica coated polycarbonate sheet remains the same.

TABLE 6

|  | Haze %, 500 cycles, 0.5 kg | Haze %, 1000 cycles, 1 kg | Haze % after healing with hot air gun |
|---|---|---|---|
| Sample 2 | 5 | 42 | 1.2 |
| Sample C | 4 | 66 | 66 |

Further included in this disclosure are the following specific aspects, which do not necessarily limit the claims.

Aspect 1. A thermoplastic multilayer article comprising: a polycarbonate substrate comprising a polycarbonate composition comprising at least one of a polycarbonate homopolymer, a copolycarbonate, or a polycarbonate copolymer, the polycarbonate substrate having a first surface and an opposing second surface, optionally the polycarbonate composition having a UL-94 flammability rating of V0 or better as measured on a flame bar having a thickness of 1.5 mm, preferably 0.4 mm, more preferably 0.25 mm; and a first polyurethane layer laminated or coextruded on at least a portion of the first surface of the polycarbonate substrate, the first polyurethane layer comprising a first aliphatic thermoplastic polyurethane and a polyurethane UV stabilizer, wherein the aliphatic thermoplastic polyurethane comprises first segments formed via a reaction of caprolactone and an aliphatic isocyanate, and second segments formed via a reaction of a chain extender and the aliphatic isocyanate.

Aspect 2. The thermoplastic multilayer article of Aspect 1, wherein the thermoplastic article exhibits a cross hatch tape test rating of GT0 based on ASTM D3359-09; and after a sand trickling test according to DIN 52348 conducted on the first polyurethane layer for 5 cycles, the thermoplastic article has a delta haze of less than 5% determined according to ASTM D-1003-00, Procedure A, under D65 illumination, with a 10 degrees observer using a Haze-Gard test device.

Aspect 3. The thermoplastic multilayer article of Aspect 1, further comprising a first overlay layer disposed between the first surface of the polycarbonate substrate and the first polyurethane layer, the first overlay layer comprising an overlay layer UV stabilizer and at least one of an overlay layer polycarbonate, an acrylic polymer, or a poly(methyl methacrylate).

Aspect 4. The thermoplastic multilayer article of Aspect 1, comprising: the polycarbonate substrate; the first polyurethane layer; a first overlay layer disposed between the first surface of the polycarbonate substrate and the first polyurethane layer; a second overlay layer disposed on at least a portion of the second surface of the polycarbonate substrate, the first and second overlay layers each independently comprising an overlay layer UV stabilizer and at least one of an overlay layer polycarbonate, an acrylic polymer, or a poly(methyl methacrylate), and a second polyurethane layer disposed a surface of the second overlay layer opposing the polycarbonate substrate, the second polyurethane layer comprising a second aliphatic thermoplastic polyurethane and a second polyurethane UV stabilizer. Preferably, the second aliphatic thermoplastic polyurethane is also derived from a reaction of caprolactone, a chain extender, and an aliphatic isocyanate.

Aspect 5. The thermoplastic multilayer article of any one of Aspects 1 to 3, wherein the aliphatic isocyanate for the first and second thermoplastic polyurethane each independently comprises at least one of 1,6-hexamethylene diisocyanate (HDI), cyclohexyl diisocyanate (CHDI), isophorone diisocyanate (IPDI), or 4,4-dicyclohexylmethane diisocyanate (HMDI).

Aspect 6. The thermoplastic multilayer article of any one of Aspects 1 to 5, wherein the chain extender for the first and second thermoplastic polyurethane each independently comprises at least one of 1,4-butanediol, ethylene glycol, diethylene glycol, propylene glycol, 1,4-butylene glycol, 1,5-pentylene glycol, methylpentanediol, 1,6-hexylene glycol, neopentyl glycol, trimethylolpropane, hydroquinone ether alkoxylate, resorcinol ether alkoxylate, glycerol, pentaerythritol, diglycerol, dextrose, ethylenediamine, hexamethylenediamine, isophorone diamine, diethanolamine, triethanolamine, or diisopropanolamine.

Aspect 7. The thermoplastic multilayer article of Aspect 5 or Aspect 6, wherein the first and second polyurethane layers each independently has a thickness of 25 to 300 micrometers.

Aspect 8. The thermoplastic multilayer article of any one of Aspects 1 to 7, wherein the polycarbonate substrate further comprises 0.03 to 1 wt % of a substrate UV stabilizer based on the total weight of the polycarbonate substrate.

Aspect 9. The thermoplastic multilayer article of any one of Aspects 1 to 8, wherein the polycarbonate substrate has a thickness of 0.1 to 15 millimeters.

Aspect 10. The thermoplastic multilayer article of any one of Aspects 1 to 9, wherein the polycarbonate substrate is hollow.

Aspect 11. The thermoplastic multilayer article of any one of Aspects 4 to 10, wherein the first and second overlay layers each independently comprises the overlay layer polycarbonate, and the overlay layer UV stabilizer is present in an amount of 1 to 12 wt % based on the total weight of the first or the second overlay layer.

Aspect 12. The thermoplastic multilayer article of any one of Aspects 4 to 11, wherein the first and second overlay layers each independently has a thickness of 15 to 300 microns.

Aspect 13. The thermoplastic multilayer article of any one of Aspects 1 to 10, wherein the first and second overlay layers each independently comprises the acrylic polymer, and the overlay layer UV stabilizer is present in an amount of 20 to 50 wt % based on the total weight of the first or second overlay layer.

Aspect 14. The thermoplastic multilayer article of Aspect 13, wherein the first and second overlay layers each independently has a thickness of 1 to 10 micrometers.

Aspect 15. The thermoplastic multilayer article of any one of Aspects 1 to 14, wherein the article has a light transmission of greater than 90% determined according to ASTM D-1003-00, Procedure A, under D65 illumination, with a 10 degrees observer using a Haze-Gard test device.

Aspect 16. The thermoplastic multilayer article of any one of Aspects 1 to 15, wherein the first polyurethane layer has a delta haze of less than 10% determined according to ASTM D-1003-00, Procedure A, under D65 illumination, with a 10 degrees observer using a Haze-Gard test device, after Taber abrasion testing on the first polyurethane layer using CS-10F abrading wheels and 500 gram weights for 500 cycles in accordance with ASTM D1044-13.

Aspect 17. The thermoplastic multilayer article of any one of Aspects 1 to 16, wherein the article has a delta haze of less than 5%, and a delta yellowness index of less than 4%, after 7,000 hours of accelerated weathering according to ISO 11341-2004.

Aspect 18. The thermoplastic multilayer article of any one of Aspects 1 to 17, wherein the article has a delta haze of less than 10%, after the aliphatic polyurethane layer is damaged by CS-17 abrading wheels with a 1 kilogram weight for 1000 cycles in accordance with ASTM D1044-13 and then heated with a hot air gun at 130° C. for 10 seconds.

Aspect 19. A process of manufacturing a thermoplastic multilayer article of any one of Aspects 1 to 18 comprising: lamination or coextrusion.

The singular forms "a," "an," and "the" include plural referents unless the context clearly dictates otherwise. "Or" means "and/or" unless clearly indicated otherwise by context. Unless defined otherwise, technical and scientific terms used herein have the same meaning as is commonly understood by one of skill in the art to which this invention belongs. A "combination" is inclusive of blends, mixtures, alloys, reaction products, and the like. "One or more of the foregoing" means at least one the listed material. As used herein, delta refers to the difference between the specified measurement prior to aging compared to the specified measurement after the identified period of aging.

Unless otherwise specified herein, any reference to standards, regulations, testing methods and the like refers to the standard, regulation, guidance or method that is in force as of Jan. 1, 2019.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While typical embodiments have been set forth for the purpose of illustration, the foregoing descriptions should not be deemed a limitation on the scope herein. Accordingly, various modifications, adaptations, and alternatives can occur to one skilled in the art without departing from the spirit and scope herein.

We claim:

1. A thermoplastic multilayer article comprising:
   a polycarbonate substrate comprising a polycarbonate composition comprising at least one of a polycarbonate homopolymer, a copolycarbonate, or a polycarbonate copolymer, the polycarbonate substrate having a first surface and an opposing second surface; and
   a first polyurethane layer laminated or coextruded on at least a portion of the first surface of the polycarbonate substrate, the first polyurethane layer comprising a first aliphatic thermoplastic polyurethane and a polyurethane UV stabilizer,
   wherein the first aliphatic thermoplastic polyurethane comprises first segments formed via a reaction of caprolactone and an aliphatic isocyanate, and second segments formed via a reaction of a chain extender and the aliphatic isocyanate
   wherein the thermoplastic multilayer article exhibits a cross hatch tape test rating of GT0 based on ASTM D3359-09; and
   after a sand trickling test according to DIN 52348 conducted on the first polyurethane layer for 5 cycles, the thermoplastic multilayer article has a delta haze of less than 5% determined according to ASTM D-1003-00, Procedure A, under D65 illumination, with a 10 degrees observer using a Haze-Gard test device.

2. The thermoplastic multilayer article of claim 1, further comprising a first overlay layer disposed between the first surface of the polycarbonate substrate and the first polyurethane layer, the first overlay layer comprising an overlay layer UV stabilizer and at least one of an overlay layer polycarbonate, an acrylic polymer, or a poly(methyl methacrylate).

3. The thermoplastic multilayer article of claim 1, comprising:
   the polycarbonate substrate;
   the first polyurethane layer;
   a first overlay layer disposed between the first surface of the polycarbonate substrate and the first polyurethane layer;
   a second overlay layer disposed on at least a portion of the second surface of the polycarbonate substrate, the first and second overlay layers each independently comprising an overlay layer UV stabilizer and at least one of an overlay layer polycarbonate, an acrylic polymer, or a poly(methyl methacrylate), and
   a second polyurethane layer disposed a surface of the second overlay layer opposing the polycarbonate substrate, the second polyurethane layer comprising a second aliphatic thermoplastic polyurethane and a second polyurethane UV stabilizer.

4. The thermoplastic multilayer article of claim 1, wherein the aliphatic isocyanate comprises at least one of 1,6-hexamethylene diisocyanate (HDI), cyclohexyl diisocyanate (CHDI), isophorone diisocyanate (IPDI), or 4,4-dicyclohexylmethane diisocyanate (HMDI).

5. The thermoplastic multilayer article of claim 1, wherein the chain extender comprises at least one of 1,4-butanediol, ethylene glycol, diethylene glycol, propylene glycol, 1,4-butylene glycol, 1,5-pentylene glycol, methylpentanediol, 1,6-hexylene glycol, neopentyl glycol, trimethylolpropane, hydroquinone ether alkoxylate, resorcinol ether alkoxylate, glycerol, pentaerythritol, diglycerol, dextrose, ethylenediamine, hexamethylenediamine, isophorone diamine, diethanolamine, triethanolamine, or diisopropanolamine.

6. The thermoplastic multilayer article of claim 4, wherein the first and second polyurethane layers each independently has a thickness of 25 to 300 micrometers.

7. The thermoplastic multilayer article of claim 1, wherein the polycarbonate substrate further comprises 0.03 to 1 wt % of a substrate UV stabilizer based on the total weight of the polycarbonate substrate.

8. The thermoplastic multilayer article of claim 1, wherein the polycarbonate substrate has a thickness of 0.1 to 15 millimeters.

9. The thermoplastic multilayer article of claim 1, wherein the polycarbonate substrate is hollow.

10. The thermoplastic multilayer article of claim 3, wherein the first and second overlay layers each independently comprises the overlay layer polycarbonate, and the overlay layer UV stabilizer is present in an amount of 1 to 12 wt % based on the total weight of the first or the second overlay layer; and wherein the first and second overlay layers each independently has a thickness of 15 to 300 microns.

11. The thermoplastic multilayer article of claim 3, wherein the first and second overlay layers each independently comprises the poly(methyl methacrylate), and the overlay layer UV stabilizer is present in an amount of 1 to 12 wt % based on the total weight of the first or the second overlay layer; and wherein the first and second overlay layers each independently has a thickness of 15 to 300 microns.

12. The thermoplastic multilayer article of claim 1, wherein the first and second overlay layers each independently comprises the acrylic polymer, and the overlay layer UV stabilizer is present in an amount of 20 to 50 wt % based on the total weight of the first or second overlay layer; and wherein the first and second overlay layers each independently has a thickness of 1 to 10 micrometers.

13. The thermoplastic multilayer article of claim 1, wherein one or more of the following conditions apply:
   the thermoplastic multilayer article has a light transmission of greater than 90% determined according to ASTM D-1003-00, Procedure A, under D65 illumination, with a 10 degrees observer using a Haze-Gard test device;
   the first polyurethane layer has a delta haze of less than 10% determined according to ASTM D-1003-00, Procedure A, under D65 illumination, with a 10 degrees observer using a Haze-Gard test device, after Taber abrasion testing on the first polyurethane layer using CS-10F abrading wheels and 500 gram weights for 500 cycles in accordance with ASTM D1044-13;

the thermoplastic multilayer article has a delta haze of less than 5%, and a delta yellowness index of less than 4%, after 7,000 hours of accelerated weathering according to ISO 11341-2004; or the thermoplastic multilayer article has a delta haze of less than 10%, after the aliphatic polyurethane layer is damaged by CS-17 abrading wheels with a 1 kilogram weight for 1000 cycles in accordance with ASTM D 1044-13 and then heated with a hot air gun at 130° C. for 10 seconds.

14. A process of manufacturing a thermoplastic multilayer article of claim 1 comprising: lamination and/or extrusion.

15. The process of claim 14 further comprising thermoforming after the lamination and/or extrusion.

16. The thermoplastic multilayer article of claim 1 wherein the article has a shape created by thermoforming.

* * * * *